United States Patent [19]

Kumakura

[11] Patent Number: 5,079,911
[45] Date of Patent: Jan. 14, 1992

[54] GAS-TURBINE POWER PLANT

[75] Inventor: Hirotake Kumakura, Yokosuka City, Japan

[73] Assignee: Nissan Motor Company, Ltd., Japan

[21] Appl. No.: 487,724

[22] Filed: Mar. 5, 1990

[30] Foreign Application Priority Data

Mar. 9, 1989 [JP] Japan ................................. 1-57389

[51] Int. Cl.⁵ .............................................. F02C 7/10
[52] U.S. Cl. ............................................... 60/39.511
[58] Field of Search ............. 60/39.511, 39.512, 39.31, 60/727

[56] References Cited

U.S. PATENT DOCUMENTS 2,358,301  9/1944  Brauns ............................... 60/39.511
4,070,825  1/1978  Kronogard ......................... 60/39.511

FOREIGN PATENT DOCUMENTS 1274606  9/1961  France ............................... 60/39.511
330986   8/1958  Switzerland ....................... 60/39.511

OTHER PUBLICATIONS

Irwin Stambler, "Garrett Grooms 50-kW Turbine for Cogeneration Applications" Gas Turbine World, Mar.-Apr. 1987, pp. 24-25.

Primary Examiner—Louis J. Casaregola
Attorney, Agent, or Firm—Lowe, Price, LeBlanc & Becker

[57] ABSTRACT

A gas-turbine power plant includes a recuperator and a combustor which are arranged in a parallel relation with respect to the direction of flow of exhaust gas through the recuperator. The recuperator and the cumbustor are enclosed in a chamber so that a space of the chamber surrounding the recuperator and the combustor serves as a passage for introducing intake air from a compressor to the recuperator.

5 Claims, 5 Drawing Sheets

GAS-TURBINE POWER PLANT

BACKGROUND OF THE INVENTION

1. Field of the Invention

The present invention relates in general to gas turbines and more particularly to a gas-turbine power plant of the recuperative type.

2. Description of the Prior Art

An example of a prior art gas-turbine power plant is disclosed in pages 24–25 of "Gas Turbine World: March-April 1987" and also shown in FIG. 7. Referring to the figure, a gas-turbine power plant 41 includes a compressor 42, a combustor 49 and a turbine 43 connected to the compressor 42 by means of a shaft 44 so as to drive a load 46 by way of a reduction gear 45.

A recuperator 47 includes a flow passage 47a for conducting, as indicated by the arrows, high-temperature exhaust gas from the turbine 43 and a flow passage 47b for conducting low-temperature intake air from the compressor 42. The flow passages 47a and 47b are arranged side by side with heat conductive thin-wall therebetween so that the heat of the exhaust gas from the turbine 43 is conducted to the intake air for thereby improving the performance efficiency of the power plant, e.g., the fuel consumption rate.

Such a recuperative type gas-turbine power plant requires a heat insulating material 51 for insulating the combustor 49, the turbine 43 and a duct 50 interconnecting therebetween for attaining a good performance efficiency while at the same time for protecting adjacent parts and elements from the heat of the power plant. Due to this, a space for disposition of the heat insulating material 51 is necessitated, resulting in an increased size of the gas-turbine power plant, an increased number of constitutent parts and therefore an increased assembling and manufacturing cost.

SUMMARY OF THE INVENTION

In accordance with the present invention, there is provided a gas-turbine power plant which comprises a combustor for combusting intake air/fuel mixture supplied thereto and discharging hot gas, a compressor for supplying intake air to said combustor, a turbine for receiving the hot gas from said combustor and emitting exhaust gas, a recuperator for receiving the exhaust gas from said turbine and the intake air from said compressor for conducting heat of the exhaust gas to the intake air, said recuperator being disposed in a parallel relation to said combustor with respect to a direction of flow of the exhaust gas through said recuperator, and a chamber enclosing therewithin said recuperator and said combustor so that a space of said chamber surrounding said recuperator and said combustor constitutes a passage for introducing the intake air from said compressor to said recuperator.

This structure is effective for solving the above noted problem inherent in the prior art device.

It is accordingly an object of the present invention to provide a novel gas-turbine power plant which can improve the performance efficiency while at the same time can reduce the amount of heat insulating material considerably.

It is another object of the present invention to provide a novel gas-turbine power plant which is compact in size, light in weight and economical in cost.

DESCRIPTION OF THE PREFERRED EMBODIMENTS

Figure 1:
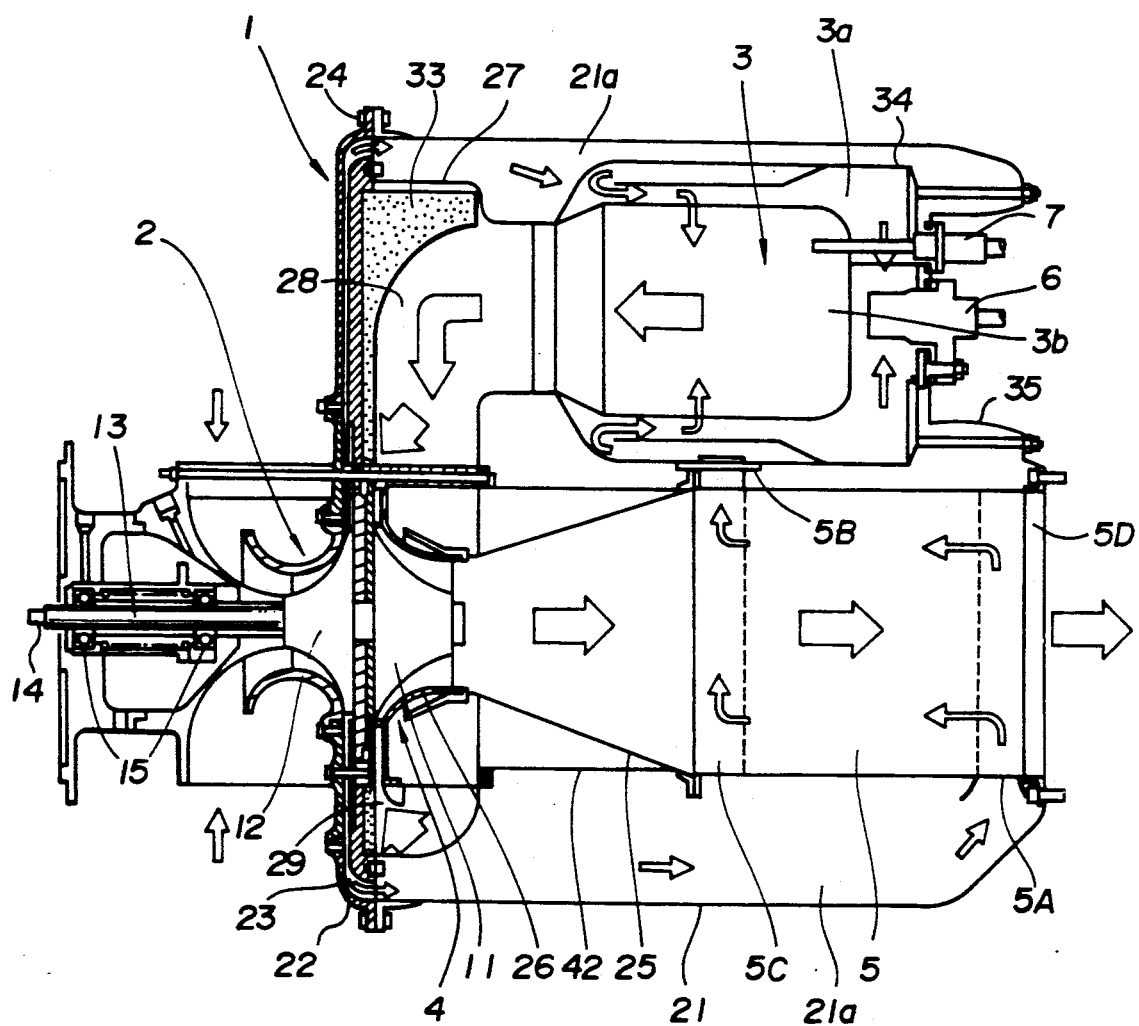
FIG. 1 is a schematic sectional view of a gas-turbine power plant according to an embodiment of the present invention.
Figure 2:
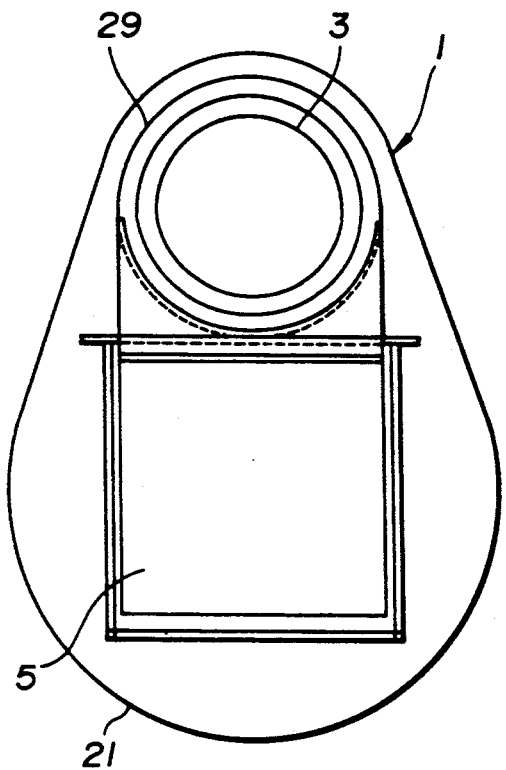
FIG. 2 is a schematic elevational view of the gas-turbine power plant of FIG. 1.
Figure 3:
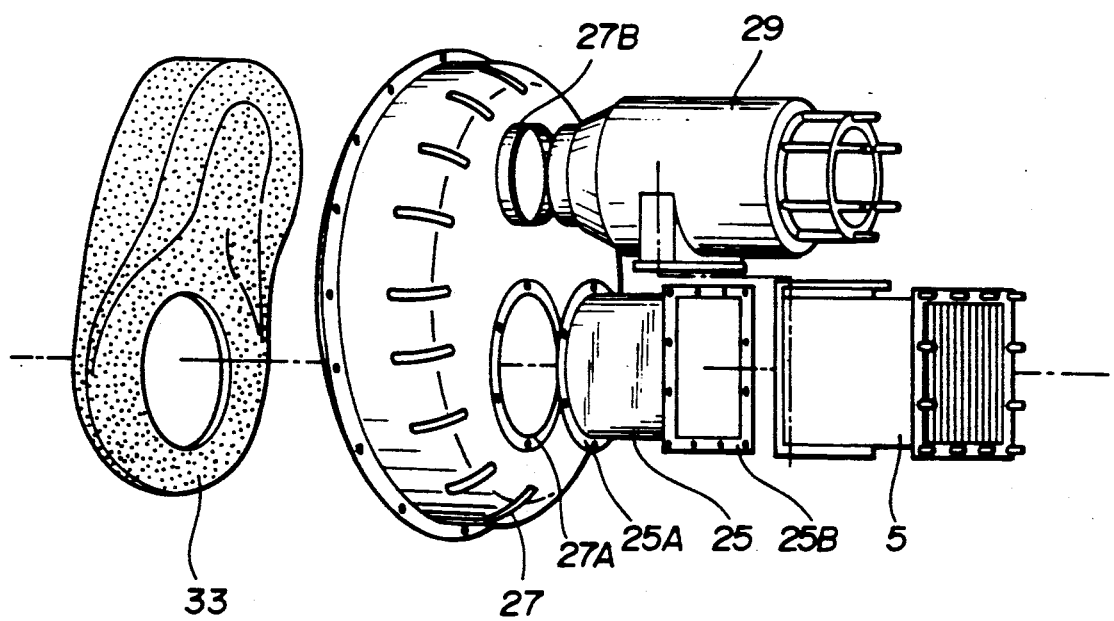
FIG. 3 is a schematic exploded view of the gas-turbine power plant of FIG. 1.

Referring to FIGS. 1 to 4, a gas-turbine power plant according to an embodiment of the present invention is generally indicated by the reference numeral 1 and includes a compressor 2, a combustor 3 and a turbine 4. The turbine 4 includes a turbine rotor 11 which is driven by high-temperature exhaust gas from the combustor 3. The turbine rotor 11 is arranged in line with a centrifugal type compressor impeller 12 and connected thereto by means of a shaft 13. The shaft 13 is supported in a cantilever manner by a pair of ball bearings 15 and 15 and formed with, at one end, a gear 14 for driving connection with a load.

Exhaust gas is emitted from a turbine housing 26 of the turbine 4 and flows into a recuperator 5 through a diffuser 25, as indicated by large arrows, so that the heat of the exhaust gas is conducted to incoming intake air from the compressor 2 as indicated by small arrows.

The diffuser 25 is connected through a plenum chamber 27 to the turbine housing 26. In this connection, the diffuser 25 is formed with a circular flange 25A for connection with the plenum chamber 27 and a rectangular flange 25B for connection with the recuperator 5. To this end, the plenum chamber 27 is formed with a flange 27A for connection with the flange 25a of the diffuser 25. The plenum chamber 27 is also formed with a flange 27B for connection with the combustor 3.

The recuperator 5 is formed with an exhaust gas passage parallel to the axial direction of the shaft 13 for conducting therethrough exhaust gas coming from the turbine 4. The recuperator 5 is also formed with an intake air passage generally parallel to the exhaust gas passage for conducting intake air coming from the compressor 2. The exhaust gas passage and the intake air passage of the recuperator 5 are arranged side by side with heat conductive thin-wall therebetween.

The recuperator 5 and the combustor 3 are arranged side by side and in parallel relation to each other with respect to the direction of flow of exhaust gas through the recuperator 5. The recupelator 5, the combustor 3 and the turbine 4 are disposed within a chamber 21 such that a space 21a of the chamber 21 surrounding the recuperator 5, the combustor 3 and the turbine 4 serves as an intake air passage for conducting intake air coming from the compressor 2 to the recuperator 5. More specifically, intake air is compressed by a compressor impeller 12 and emitted from the compressor 2. The intake air then flows, as indicated by small arrows, into the space 21a of the chamber 21 through an annular passage 23 formed in a flange 22 for closing an end of the chamber 21. The chamber 21 and the flange 22 are fastened together by means of a plurality of bolts.

The recuperator 5 is formed with an inlet port 5A for introducing thereinto the intake air coming from the space 21a of the chamber 21. The intake air introduced through the inlet port 5A into the recuperator 5 is heated by the coming exhaust gase and changes its direction of flow at a header 5C. Therefrom, the intake air flows into the combustor 3 through an outlet port (not shown) formed in a flange 5B of the recuperator 5 for connection with the combustor 3.

While the recuperator 5 has been described and shown as being the counterflow type, it is not limitative, for example, a crossflow type recupelator may be used in place thereof.

The combustor 3 is provided with a fuel injector 6 and an ignition plug 7. The injector 6 injects fuel into the combustor 3. The fuel is mixed with the intake air coming from the recuperator 5 to form an air/fuel mixture. The air/fuel mixture is ignited by the plug 7 and burnt into hot gas. The hot gas is emitted from the combustor 3 as indicated by large arrows. The hot gas emitted from the combustor 3 changes its direction of flow at a flow passage 28 defined by the plenum chamber 27 and a insulating material 33 and flows into a spiral flow passage 29 defined by the turbine housing 26. The hot gas is then supplied to a turbine rotor 11 to drive same and thereafter discharged as exhaust gas. The insulating material 33 is bonded to the flange 22 and insulates the flow passage 28 in the plenum chamber 27.

Figure 4:
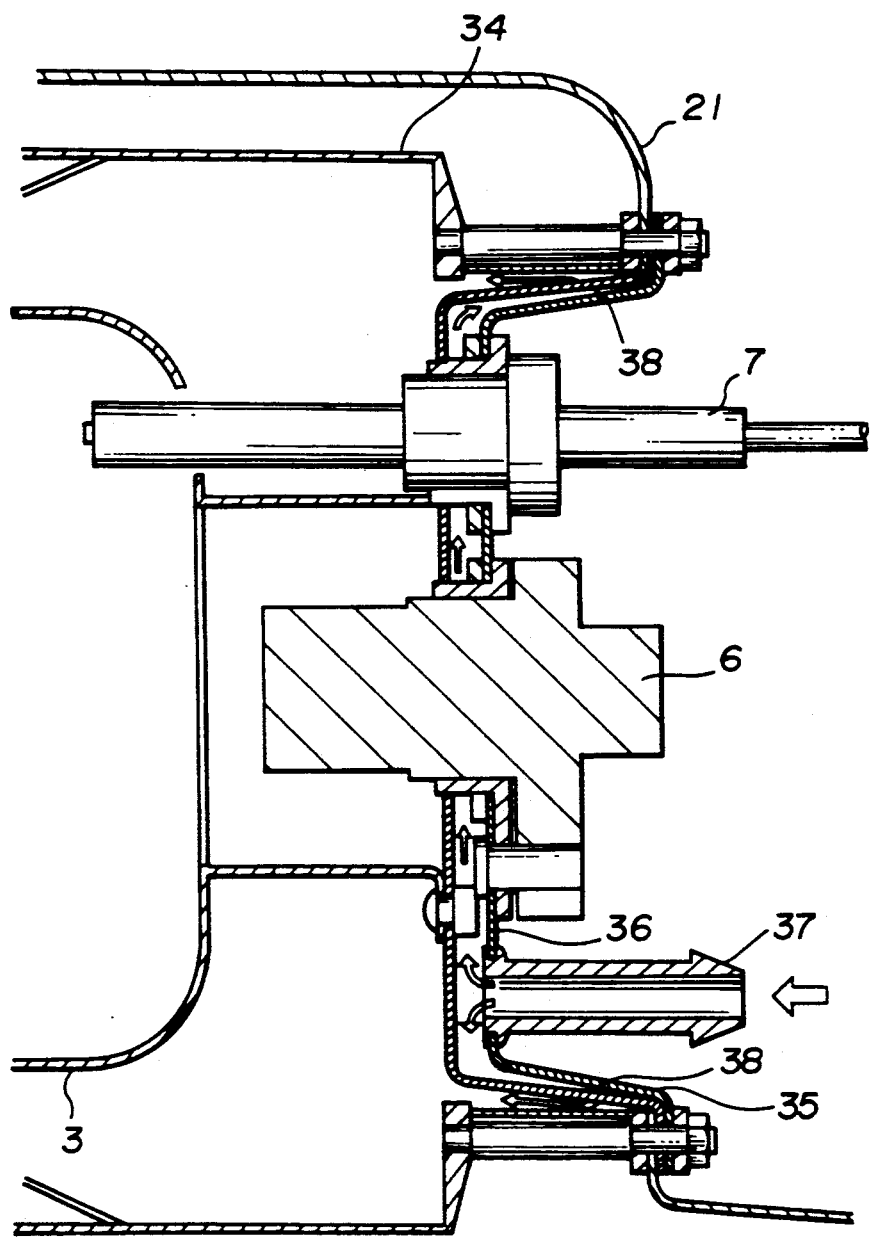
FIG. 4 is an enlarged fragmentary sectional view of the gas-turbine power plant of FIG. 1.

In FIG. 4, a cap 35 is shown which closes the other end of the combustor 3 opposite to the end closed by the flange 22 and has installed thereon the fuel injector 6 and the ignition plug 7. The cap 35 is hollow and formed with a flow passage 36 into which intake air is introduced through an inlet port 37. The intake air then flows through a plurality of outlet ports 38 and an outer peripheral chamber 3a of the combustor 3 into a combustion chamber 3b of the combustor 3. By this, it becomes possible to cool the fuel injector 6 and the ignition plug 7 and at the same time insulate the combustor 3.

In operation, heat radiating from the combustor 3, the turbine 4 and the recuperator 5 is conducted to intake air flowing through the space 21a of the chamber 21. Accordingly, the space 21a of the chamber 21 is operative to serve not only as an additional recuperator but as a heat insulator, thus making it possible not only to improve the performance efficiency of the power plant but to considerably reduce the amount of heat insulating material necessary for insulating the combustor 3, the turbine 4 and the recuperator 5. The gas-turbine power plant 1 therefore can be compact in size and light in weight.

The recuperator 5 is connected in line with the turbine 4 by way of the diffuser 25 and in parallel with the combustor 3 by way of the flange 5a. By this, any voluminous piping for connecting them is not required, thus being contributive to the compact size.

The chamber 21 is formed into a hollow cylindrical shape and adapted to be connected with the flange 22 and the cap 35 at the opposite ends, respectively. Such a cylindrical chamber 21 can attain a sufficient rigidity for supporting the recuperator 5, the combustor 3, etc. and a strength necessitated for serving as a pressure container, even with a relatively thin sheet of metal from which it is formed, thus making it possible to reduce the weight.

Further, the chamber 21 can be formed from a sheet metal by pressing, thus being contributive to reduction of the cost.

Figure 5:
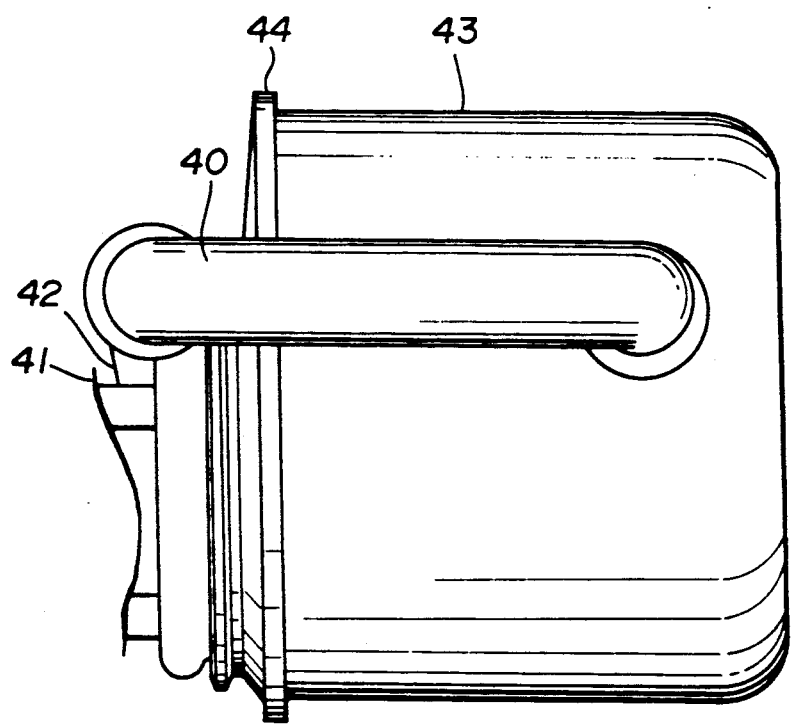
FIG. 5 is a side elevational view of a gas-turbine power plant according to another embodiment of the present invention.
Figure 6:
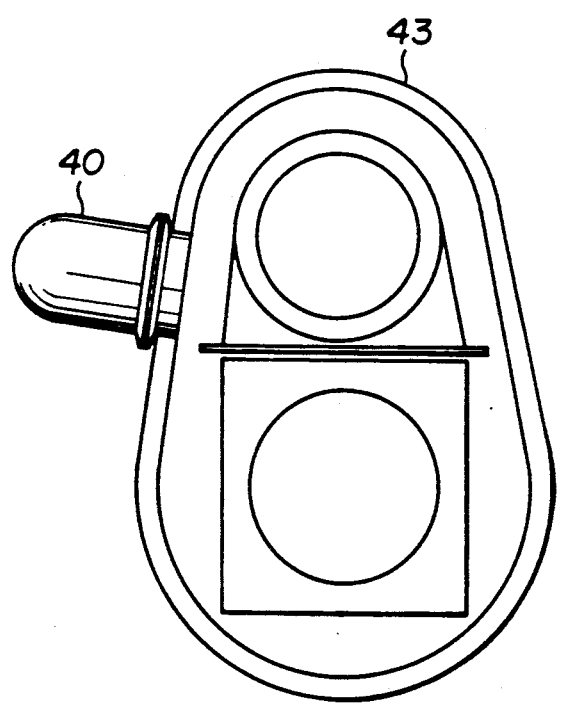
FIG. 6 is an elevational view of the gas-turbine power plant of FIG. 5.
Figure 7:
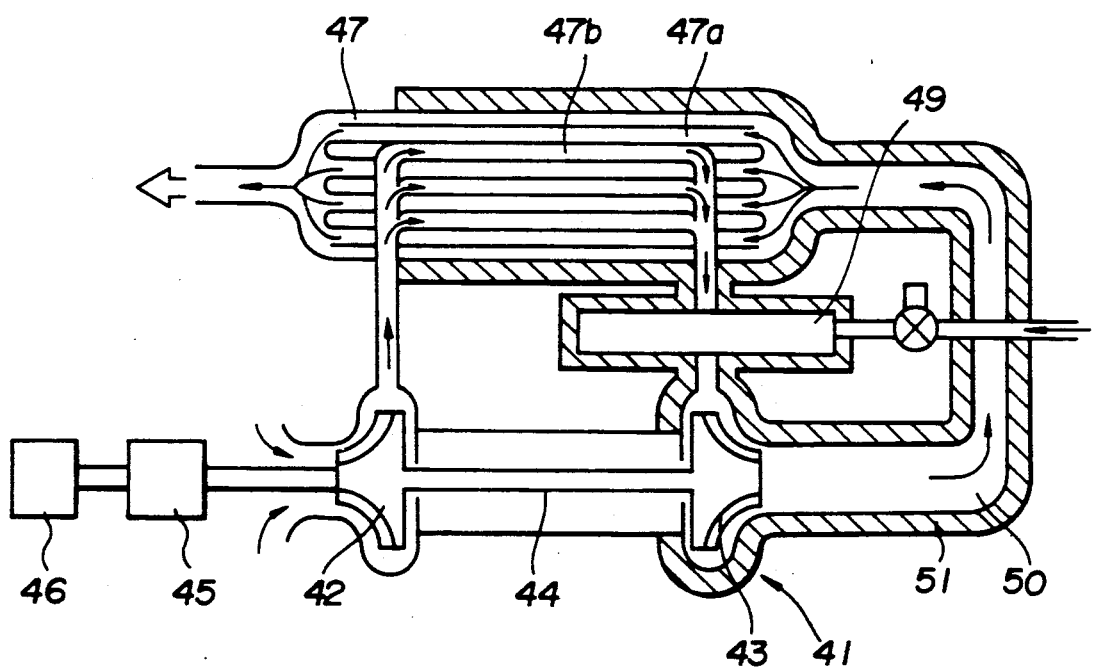
FIG. 7 is a schematic sectional view of a prior art gas-turbine power plant.

FIGS. 5 and 6 show another embodiment of the present invention in which a duct 40 is disposed outside of a chamber 43 for conducting intake air from a spiral scrawl 42 of a compressor 41 to the inside of a chamber 43. The chamber 43 is cylindrical and connected through a flange 44 to a compressor housing 41. Though not shown, the chamber 43 is adapted to enclose therewithin a combustor, a turbine and a recuperator which are arranged similarly to the previous embodiment.

This embodiment makes it possible to reduce the design restrictions of the gas-turbine power plant, for example, to dispose a bearing or bearings in the place between the compressor and the turbine.

From the foregoing, it will be understood that according to the present invention a recuperator and a combustor are arranged in parallel to each other and enclosed by a chamber so that a space of the chamber surrounding the recuperator and the combustor serves as a passage for conducting therethrough intake air coming from the compressor to the recuperator, whereby the above described space of the chamber can be operative to serve not only as an additional recuperator for conducting heat of exhaust gas to intake air but as a heat insulator, thus making it possible to improve the performance efficiency of the power plant and make unnecessary a considerable amount of insulating material, piping, etc. for thereby making the gas-turbine power plant compact in size, light in weight and economical in cost.

What is claimed is:

1. A gas-turbine power plant comprising:
   a combustor for combusting intake air/fuel mixture supplied thereto and discharging hot gas;
   a compressor eccentric with said combustor for supplying intake air to said combustor;
   a turbine concentric with said compressor for receiving the hot gas from said combustor and emitting exhaust gas;
   a recuperator concentric with said compressor and said turbine for receiving the exhaust gas from said turbine and the intake air from said compressor and supplying the intake air to said combustor after heat exchange between the intake air and the exhaust gas; and
   (a) an intake air chamber enclosing therewithin said recuperator and said combustor so that a space within said intake air chamber and surrounding said recuperator and said combustor constitutes a passage for introducing the intake air from said compressor to said recuperator, said intake air chamber being hollow cylindrical and having at one of opposite axial ends an end closure;
   said compressor and said turbine being disposed at said one axial end of said intake air chamber so as to interpose therebetween said end closure;
   said recuperator being constructed to convey the exhaust gas axially thereof and toward the other of said opposite ends of said intake air chamber.

2. The gas-turbine power plant as claimed in claim 1, further comprising a plenum chamber within said intake air chamber, said plenum chamber cooperating with said end closure to define therebetween a flow passage for conducting the hot gas from said combustor to said turbine, said end closure being formed with a passage for introducing the intake air from said compressor into said space of said intake air chamber.

3. The gas-turbine power plant as claimed in claim 2 wherein said intake air chamber has at said other axial end a second end closure which is hollow, said second end closure having installed thereon a fuel injector and an ignition plug and formed with a passage for introducing the intake air from said compressor to said combustor.

4. The gas-turbine power plant as claimed in claim 3 wherein said combustor has a combustion chamber and an outer peripheral chamber surrounding said combustion chamber, said passage formed in said second end closure being communicated with said outer peripheral chamber of said combustor.

5. The gas-turbine power plant as claimed in claim 1, further comprising a duct disposed outside of said chamber for introducing the intake air from said compressor to said recuperator.

* * * * *